US006471425B1

(12) United States Patent
Cornelius et al.

(10) Patent No.: US 6,471,425 B1
(45) Date of Patent: Oct. 29, 2002

(54) PRELOADED STABILIZER MECHANISM IN A DOT MATRIX PRINTER

(75) Inventors: Craig J. Cornelius, Woodinville, WA (US); Daniel A. Durland, Seattle, WA (US)

(73) Assignee: Tally Printer Corporation, Kent, WA (US)

( * ) Notice: Subject to any disclaimer, the term of this patent is extended or adjusted under 35 U.S.C. 154(b) by 0 days.

(21) Appl. No.: 09/710,091

(22) Filed: Nov. 10, 2000

(51) Int. Cl.[7] ......................... B41J 19/02; G05D 19/00; G05D 19/02

(52) U.S. Cl. ....................... 400/283; 400/341; 267/136; 267/137

(58) Field of Search ............................ 188/268; 347/37, 347/38, 39; 400/283, 313, 319, 323, 337, 338, 341, 320; 267/136, 137

(56) References Cited

U.S. PATENT DOCUMENTS

| | | | | | |
|---|---|---|---|---|---|
| 1,805,139 | A | | 5/1931 | Good | |
| 2,515,795 | A | | 7/1950 | Patrignani | |
| 3,724,631 | A | * | 4/1973 | Kaczeus | 101/93.17 |
| 4,248,148 | A | | 2/1981 | Mahoney et al. | |
| 4,543,884 | A | | 10/1985 | Kikuchi et al. | |
| 4,991,984 | A | * | 2/1991 | Fare' | 400/335 |
| 5,026,186 | A | * | 6/1991 | Hasegawa et al. | 400/691 |
| 5,595,448 | A | * | 1/1997 | Harada | 400/320 |
| 5,679,991 | A | | 10/1997 | Wolf | |
| 5,846,059 | A | | 12/1998 | Mizuno et al. | |
| 5,924,809 | A | * | 7/1999 | Wotton et al. | 400/691 |
| 6,310,638 | B1 | * | 10/2001 | Heiles et al. | 347/37 |

FOREIGN PATENT DOCUMENTS

| | | | | |
|---|---|---|---|---|
| JP | 64-86377 | A | * | 3/1989 |
| JP | 11-164092 | A | * | 6/1999 |

* cited by examiner

*Primary Examiner*—Daniel J. Colilla
(74) *Attorney, Agent, or Firm*—Christensen O'Connor Johnson Kindness PLLC

(57) ABSTRACT

A preloaded stabilizer mechanism in a dot matrix line printer having a reciprocating carriage is provided to: (1) establish a rigid reference point that prevents the print line of the dot matrix line printer from drifting; (2) eliminate backlash; and, (3) create a carriage resonance frequency that is greater than the carriage operating frequency to enhance printer system stability and the reduction of vibration. The stabilizer mechanism is mounted on a support frame of the dot matrix line printer and includes a modified c-shaped bracket member and a spring plate. The spring plate is attached to one end of the bracket member to form a slot. The slot of the stabilizer mechanism receives an offset shaft that is coupled to a shuttle mechanism that provides the carriage with reciprocating motion. The spring plate of the stabilizer mechanism, being slightly deflected, imposes a force against the offset shaft. As the carriage is reciprocated back and forth along its line of movement, the offset shaft moves back and forth along a line that lies parallel to the carriage movement line. When the shuttle mechanism is out of balance with the carriage, the offset shaft imposes a force, corresponding to the amount of the imbalance, against the preloaded spring plate and bracket opening. In this state, the stabilizer mechanism, due to the offset shaft/slot arrangement, works in conjunction with the shuttle mechanism to translate the shuttle. The stabilizer mechanism inhibits the movement of the offset shaft with respect to the printer support frame when the force created by the imbalance is equal to or less than the force of the preload generated by the spring plate.

23 Claims, 6 Drawing Sheets

PRELOADED STABILIZER MECHANISM IN A DOT MATRIX PRINTER

FIELD OF THE INVENTION

This invention relates to dot matrix line printers and, more particularly, to a mechanism that reduces vibration and backlash in a dot matrix line printer.

BACKGROUND OF THE INVENTION

Various types of dot matrix line printers have been proposed and are in use. In general, dot matrix line printers include a print head comprising a plurality of dot printing mechanisms, each including a dot-forming element. The dot forming elements are located along a line that lies orthogonal to the direction of paper movement through the printer. Since paper movement is normally vertical, the dot forming elements usually lie along a horizontal line. Located on the side of the paper remote from the dot forming elements is a platen and located between the dot forming elements and the paper is a ribbon. The dot forming elements are spaced a discrete distance along a carriage. To allow dots to be printed closer than this discrete distance, the dot forming elements are shuttled back and forth during printing. As the dot forming elements are shuttled, they are actuated to create dots along the print line defined by the dot forming elements. The paper is incremented forwardly after each dot row is printed. A series of dot rows creates a row of characters or a graphical image.

The dot forming elements of contemporary dot matrix line printers are small anvils located on one end of an electromagnetically actuated hammer. The hammers are normally held in a retracted position by magnetic force. Release is created by the application of a pulse to an electromagnetic coil that produces a magnetic field that counteracts the retracting field. The dot forming element, hammer, retracting magnet, release coil, and related elements form a dot forming mechanism. The dot forming mechanisms may be grouped in sets or modules and the modules mounted on a carriage. See, for example, U.S. Pat. No. 4,351,235, titled Dot Printing Mechanism for Dot Matrix Line Printers.

Shuttling of the dot printing elements back and forth is accomplished by translating the carriage. In one type of line printer, the carriage is reciprocally mounted on a stationary frame by a suitable support mechanism, such as a linear bearing. The carriage shuttle motion is a consequence of a shuttle mechanism such as a crank driving either a connecting rod or a Scotch yoke. One proposed shuttle mechanism for supplying motion to the shuttle comprises a weight unbalanced mechanism that utilizes motor rotated unbalancing weights attached to a supported carriage. The rotation of the unbalancing weights produces a vibration that causes reciprocating carriage movement. Although the unbalanced weight mechanism provides adequate translational movement, there are disadvantages to the unbalanced weight configuration. The main disadvantage with this type of shuttle mechanism is the difficulty of maintaining a stable carriage versus time relationship in the presence of external forces, such as an external bump being applied to the printer, and the difficulty of keeping the print line (the starting point for each line of dots that form the characters) from drifting. If the carriage displacement versus time changes when subject to external forces, the carriage undergoes undesirable motions that result in the misplacing of printed dots. Additionally, if the print line drifts during the operation of the printer, the location of printed dots may be misplaced.

Misplacing of printed dots results in imperfectly formed characters, which is unacceptable in modern printers.

In the past, various types of dot matrix line print carriage shuttle systems for maintaining a stable carriage versus time relationship have been proposed. One such proposal is to use the unbalanced weight mechanism in conjunction with a stabilizer device. The stabilizer device utilizes a mechanism, also referred in the art as a Scotch yoke, comprising a rotating crank having an eccentric cam disk riding in a straight slot, to provide a rigid reference point between the carriage and the stationary frame. The stabilizer device also augments translational movement on the carriage to the extent that the counterweights are not perfectly balanced with the carriage.

In this particular configuration, the rotating crank is coupled to the reciprocating carriage and the straight slot is attached to the stationary frame. To eliminate sliding friction between the rotating shaft and the engagement wall of the straight slot, the rotating crank often includes a ball bearing attached to its outer end. Because the bearing cannot contact both slides of the slot at the same time, the slot is made wider than the bearing. This results in undesirable backlash in the mechanism producing unwanted vibration and inaccuracies in the translation position of the carriage. Dot matrix line printers, particularly high speed dot matrix line printers, require precision positioning of the printer head at the time the dot-forming elements are actuated by their related actuating mechanisms. Vibration and backlash reduce the precision with which the print head can be positioned. As print head positioning precision drops, dot misregistration increases. As a result, printed characters and images are distorted and/or blurred. Distorted and/or blurred images are, of course, unacceptable in environments where high quality printing is required or desired.

One method has been proposed to address the unwanted vibration and backlash in the prior stabilizer devices. Specifically, the use of two bearings mounted next to one another on the same rotating shaft has been proposed. The two bearings engage two parallel rails of the stabilizer device that are offset to accommodate the width of the bearing. Typically, the sides of the rails are equipped with rubber springs to preload the bearings to inhibit unwanted backlash. Although the preloaded double bearing functions well to inhibit backlash, there are deficiencies in this configuration. In moving carriage dot matrix printers, the resonance frequency ($F_R$) of the moving carriage mechanism on its support structure must be greater than the operating shuttle frequency ($F_O$) of the moving carriage mechanism on its support structure to provide stability and inhibit vibration in the printer system. To provide a resonance frequency ($F_R$) that meets this requirement, the spring factors of each of the rubber springs ($K_1$, $K_2$) must be significantly large. For a high operating shuttle frequency ($F_O$), if the spring factors of each of the rubber springs ($K_1$, $K_2$) are large enough to satisfy the resonance frequency ($F_R$) requirement, the preload overloads the bearings, resulting in unnecessary mechanical wear. Using bearings that are capable of handling the amount of preload required to provide a resonance frequency ($F_R$) greater than the operating shuttle frequency ($F_O$) would be cost-prohibitive in typical dot matrix line printers.

Therefore, there is a need in the printing industry for a stabilizer device that can provide a rigid reference point that prevents the print line from drifting while eliminating backlash and providing a resonance frequency ($F_R$) that is greater than the operating shuttle frequency ($F_O$) to enhance system stability and the reduction of vibration.

SUMMARY OF THE INVENTION

In accordance with the present invention, a preload stabilizer mechanism is provided in a dot matrix line printer having a carriage reciprocated by a shuttling mechanism to address the deficiencies in the prior art. More specifically, the preloaded stabilizer mechanism is provided to: (1) establish a rigid reference point that prevents the print line of the dot matrix line printer from drifting; (2) eliminate backlash; and, (3) create a resonance frequency of the moving carriage mechanism on its support structure that is greater than the operating shuttle frequency of the moving carriage mechanism on its support structure. As a result, the preloaded stabilizer mechanism enhances printer system stability and reduces printer system vibration.

In accordance to an aspect of the present invention, the preload stabilizer comprises a bracket member connectable to a support frame of the printer. The bracket member has two ends. The preload stabilizer mechanism further comprises a spring plate that has a coupled end and a free end. The spring plate is attached to one end of the bracket member to form a slot. The stabilizer mechanism is adapted to receive an offset shaft coupled to the shuttle mechanism within the slot. The spring plate is capable of imposing a preload force against the offset shaft when the offset shaft is within the slot.

In accordance with aspect of this invention, the stabilizer mechanism augments the reciprocating motion to the carriage when the shuttle mechanism is unbalanced.

In accordance with a further aspect of this invention, the stabilizer mechanism prohibits undesirable motions in the carriage as long as the force generated by the unbalanced carriage is less than the force imposed by the spring plate against the offset shaft.

In accordance with yet another aspect of this invention, the stabilizer mechanism provides the printer with a resonance frequency greater than it's operational frequency.

In one embodiment of the present invention, a printer is provided that comprises a support frame and a carriage reciprocally mounted on the support frame. The carriage has multiple print elements disposed on the carriage. A shuttle mechanism is further coupled to the carriage. The shuttle mechanism causes the carriage to reciprocate on the support frame. The printer further comprises a stabilizer mechanism mounted on the support frame. The stabilizer mechanism includes a bracket member and a spring plate. The spring plate is attached to the bracket member at one end to form a slot. The stabilizer mechanism receives an offset shaft coupled to the shuttle mechanism within the slot. The spring plate imposing a preload force against the offset shaft.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
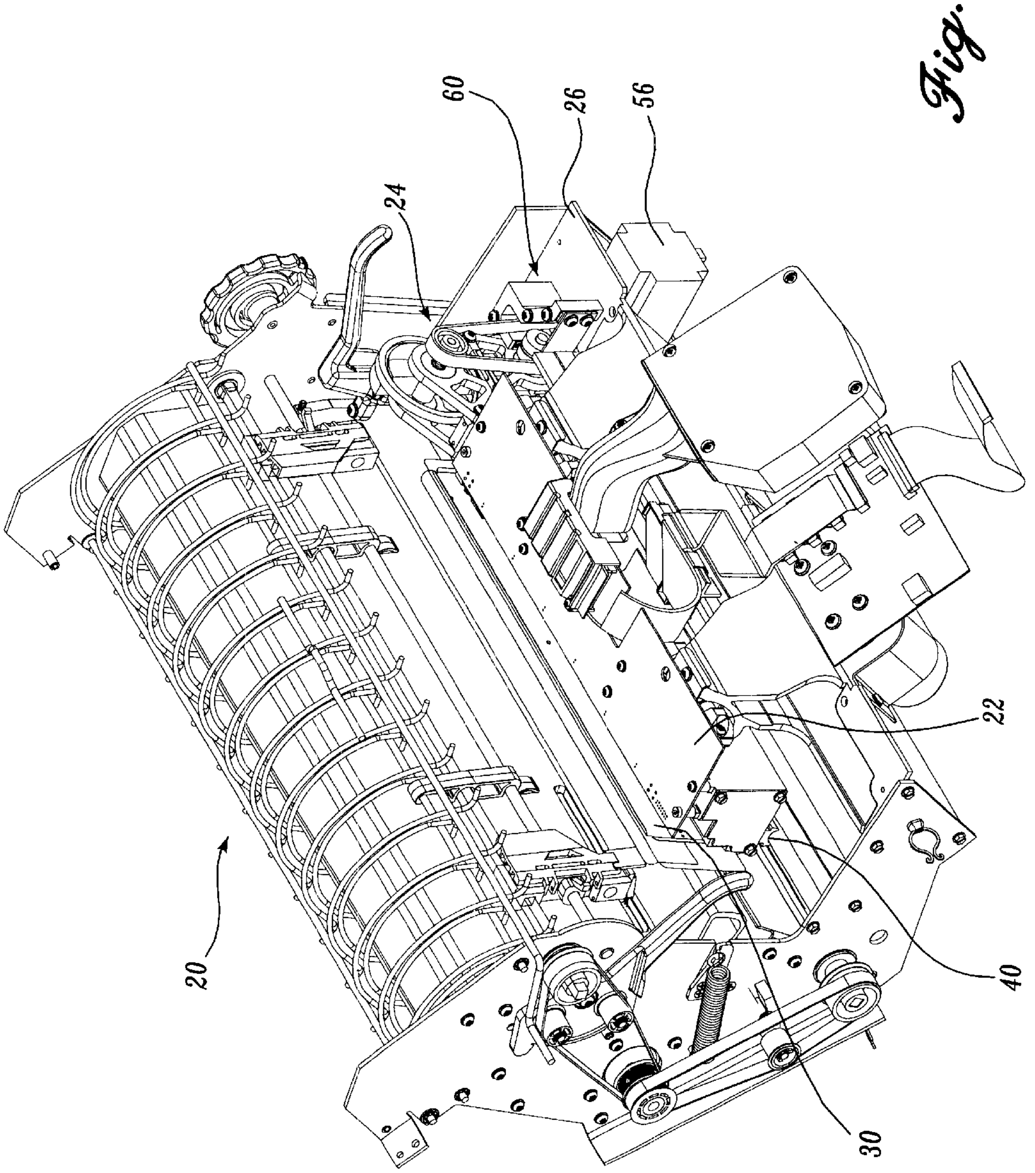
FIG. 1 illustrates a perspective view of a dot matrix line printer including a preloaded stabilizer mechanism formed in accordance with the present invention.

While, as will be better understood from the following description, the present invention was developed to reduce undesirable motions and backlash in a dot matrix line printer and, thus, is expected to find its primary use in such printers, it is to be understood that the invention can be used in other mechanisms requiring or desiring a reduction of undesirable motions and backlash present in rotary to reciprocating mechanisms, specifically a Scotch yoke mechanism.

Prior to describing an exemplary embodiment of the improved preloaded stabilizer mechanism, a brief discussion of the nature and operation of one type of dot matrix line printer suitable for incorporating the present invention is set forth. In this regard, attention is directed to FIGS. 1–3, which illustrates selected components of a dot matrix line printer 20. The dot matrix line printer 20 includes a carriage 22, a shuttle mechanism 24, a platen 30, and other necessary dot matrix line printer elements, such as a print ribbon, not shown so that the invention can be more easily seen, but well known to those familiar with dot matrix line printers. The carriage 22 and the shuttle mechanism 24 are reciprocally mounted on a suitable support structure such as a support frame 26.

The carriage 22 is elongate and supports a plurality of dot printing mechanisms well known to those skilled in the dot matrix line printer art. In general, each dot printing mechanism includes a hammer and a hammer actuating magnetic structure. The hammer is resilient, i.e., is formed of a resilient piece of metal or includes a resilient piece of metal. Mounted in the end of the hammer is a dot producing anvil. In many dot matrix line printers, the hammers are held in a retracted, cocked state by a permanent magnet and released by applying a pulse to an electromagnet. The electromagnet creates a magnetic field that counteracts the magnetic field produced by the permanent magnet, releasing the energy stored in the hammer. A plurality of dot printing mechanisms can be combined into a module and the modules mounted on the carriage. See U.S. Pat. No. 4,351,235 titled "Dot Printing Mechanisms for Dot Matrix Line Printers", by Edward D. Bringhurst and U.S. Pat. No. 4,584,937 titled "Long Release Coil Hammer Actuating Mechanism" by Edward D. Bringhurst, the subject matter of which is incorporated herein by reference, for a more detailed description of exemplary dot printing mechanisms for dot matrix line printers.

The platen 30 is mounted to the support frame, such that, the platen 30 lies parallel to the carriage 22. The platen 30 provides a solid striking surface for the dot printing mechanisms. Print paper (not shown) passes between the dot printing mechanisms mounted on the carriage 22 and the platen 30. Located between the dot printing mechanisms and the paper, but not shown in FIG. 1 in order for the invention to be more readily observed, is a print ribbon. The paper is stepped upwardly through the paper slot (not shown) and between the print ribbon and the platen 30 at a controlled rate by a drive mechanism well known in the art, such as a pair of tractor drives operated by a stepper motor. The drive mechanism incrementally steps the paper upwardly after each stroke of the carriage 22.

The carriage 22 is supported on the stationary support frame by a linear bearing comprising a channel 40 that guides the carriage 22 as the carriage 22 translates along the stationary support frame. The carriage 22 is reciprocally mounted such that the carriage 22 is free to move in a direction parallel to the elongate edge of the support frame of the dot matrix line printer. Connected to one end of the carriage 22 is a shuttle mechanism 24 that moves the carriage 22 back and forth in a reciprocating or oscillating manner.

Figure 3:
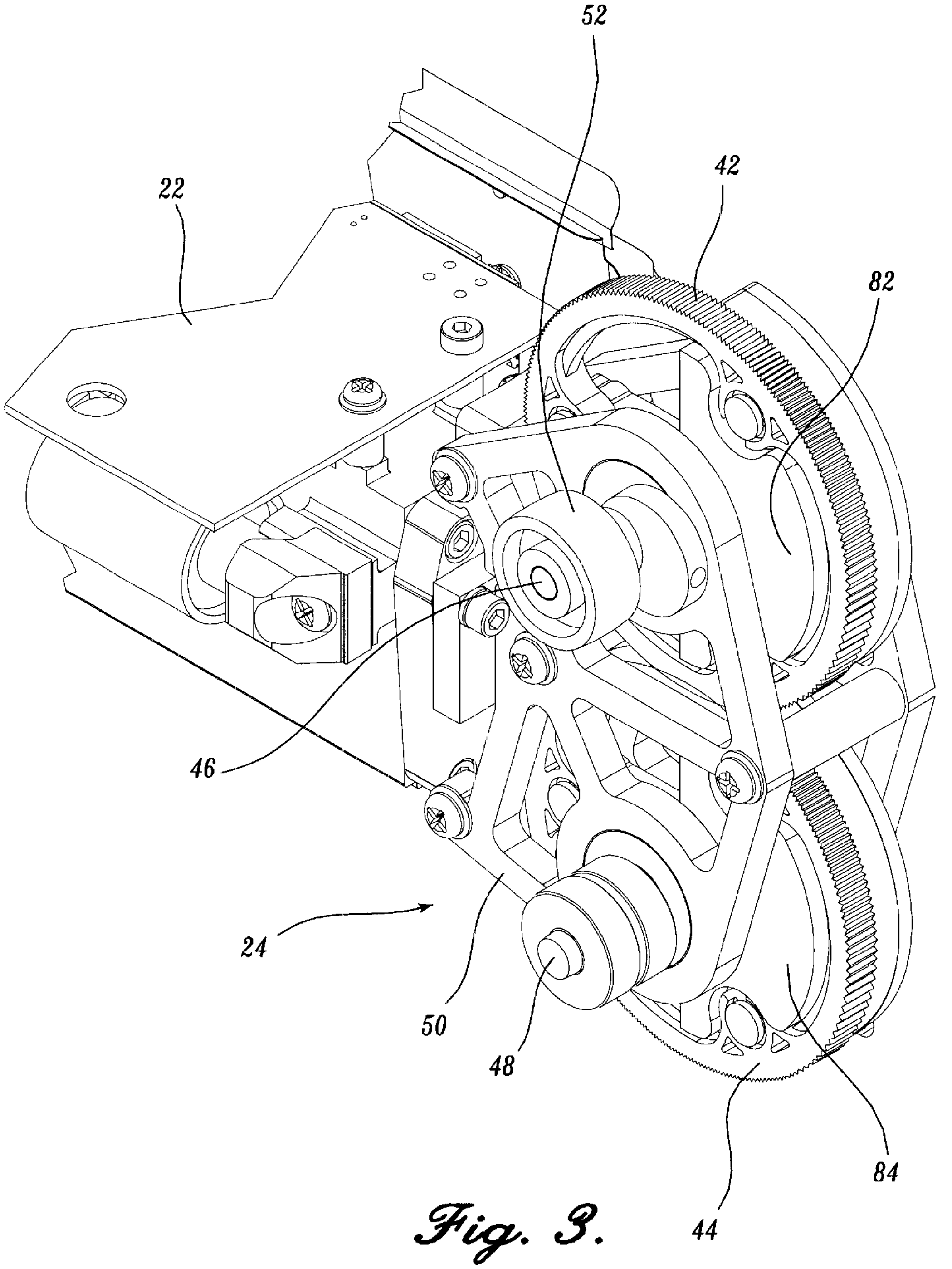
FIG. 3 is a magnified perspective view of a portion of the shuttle mechanism shown in FIG. 2.

As best shown in FIG. 3, the shuttle mechanism 24 comprises a pair of counter-rotating spur gears 42, 44 each having an unbalanced weight 82, 84 coupled thereto. The spur gears 42, 44 are coupled on horizontally oriented upper and lower shafts 46, 48 journaled between vertically aligned bores of a mounting cage 50. The mounting cage 50 includes apertures for mounting the shuttle mechanism 24 to the carriage 22. Mounted on the end of shaft 46 is a pulley 52 for providing rotation to the spur gears 42, 44. A driving belt 54 is entrained over the pulley 52 of upper shaft 46 and a pulley (not shown) coupled to an electric motor 56 mounted to the support frame 26. As the unbalanced weights of the spur gears 42, 44 rotate in opposite directions, a net horizontal force is produced that causes the carriage 24 to reciprocate in a direction parallel to the elongate side of the support frame 26 of the dot matrix printer. See U.S. Pat. No. 4,764,040 titled "Shock Stabilized, Twin Counter Weight Shuttle Drive for Reciprocably Mounted Carriages", by C. Gordon Whitaker, the subject matter of which is incorporated herein by reference, for a more detailed description of exemplary shuttle mechanisms for dot matrix line printers.

As the electric motor driven spur gears counter-rotate, the shuttling mechanism 24 translates the carriage 22 back and forth in the direction of the double headed arrow 12. As the carriage is shuttled or oscillated, the dot printing elements are actuated to create dots at predetermined positions on the paper. Each time the carriage reaches the end of its path of travel in one direction or the other, the paper is stepped or incremented in the forward direction. Thus, as the dot printing elements are oscillated, rows of dots at predetermined positions are created. A series of dot rows creates a row of characters (or an image). After a row of characters has been printed, the paper is incremented by the desired amount of character spacing, and the first dot row of the next character row is printed.

Figure 2:
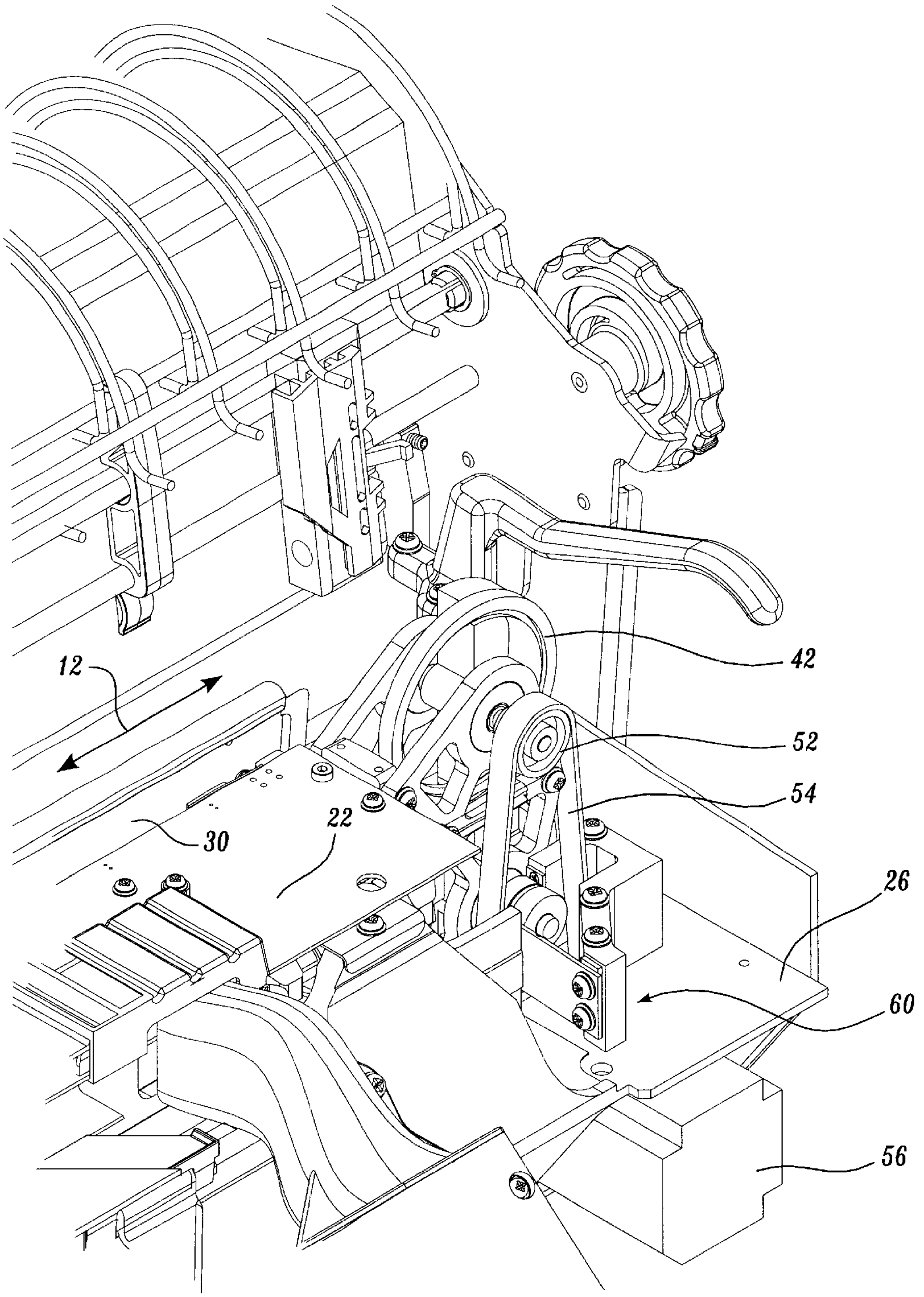
FIG. 2 is a magnified perspective view of a portion of the dot matrix line printer shown in FIG. 1.

The present invention is directed to an improved preloaded stabilizer mechanism that is particularly suitable for use in a dot matrix line printer of the type illustrated in FIGS. 1–3, and briefly described above. An exemplary embodiment of a preloaded stabilizer mechanism 60 formed in accordance with the invention is illustrated in FIGS. 4–7 and comprises a triangular shaped aperture 62 for receiving an offset or eccentric shaft 64. For ease of illustration, FIGS. 5–6 illustrate the carriage 22 and support frame 26 as two elongate plate members. The offset shaft 64 is formed on the outer end of a lower shaft 48 that is coupled to the motor 56 (FIG. 2) via the driving belt 54 (FIG. 2) and pulley 52 (in FIGS. 5–6, the offset shaft is shown as representative of the counter-rotating shuttle mechanism in FIGS. 2–3). Mounted on the offset shaft 64 are a pair of spaced apart bearings 66, 68. The offset shaft 64 and the bearings 66, 68 lie in the triangular shaped aperture 62 formed by an open-ended bracket member 70 that is attached by bolts (not shown) to the support frame 26, and a spring plate 74 attached to one end of the open-ended bracket member 70.

Figure 4:
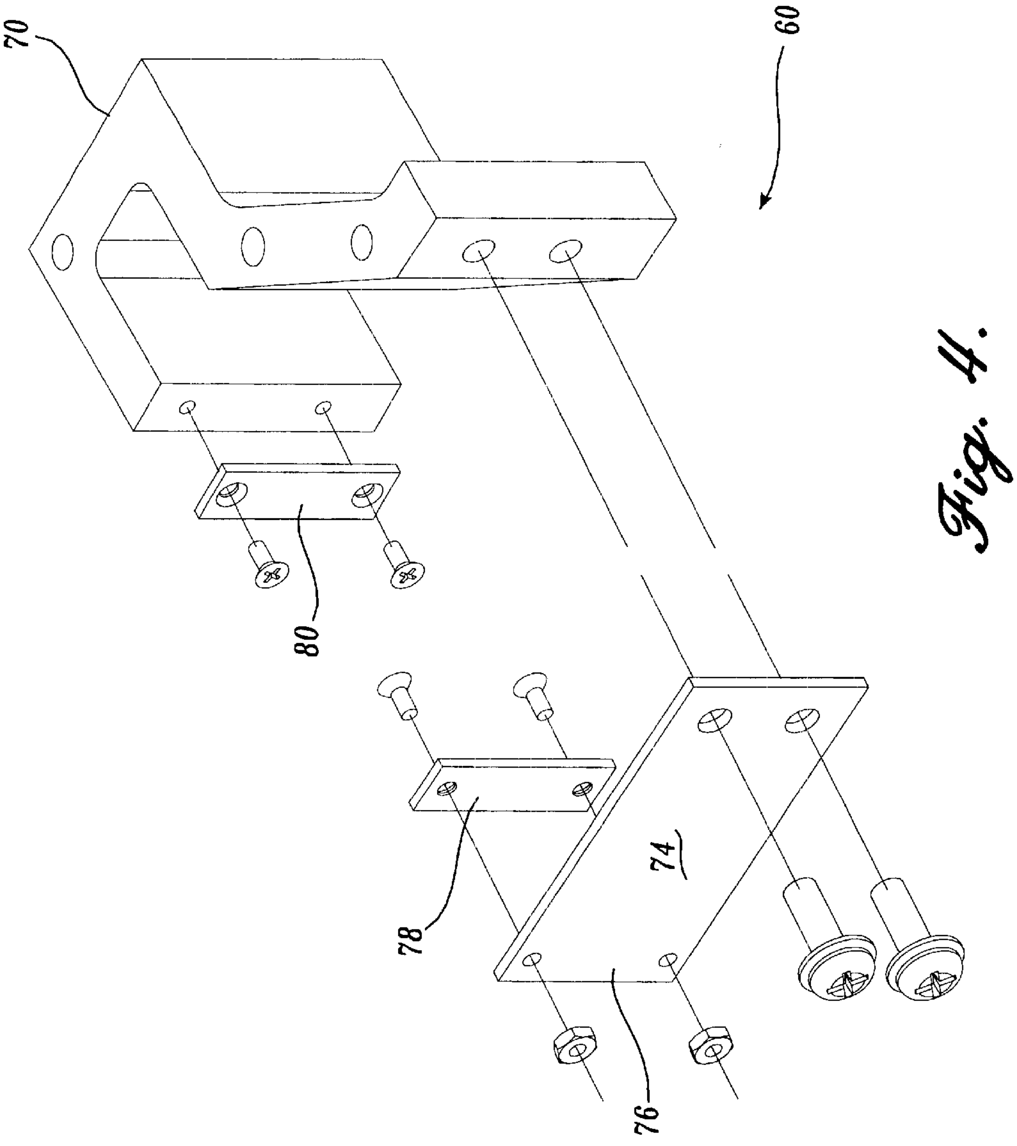
FIG. 4 is an exploded view of a preloaded stabilizer mechanism formed in accordance with aspects of the present invention.
Figure 5:
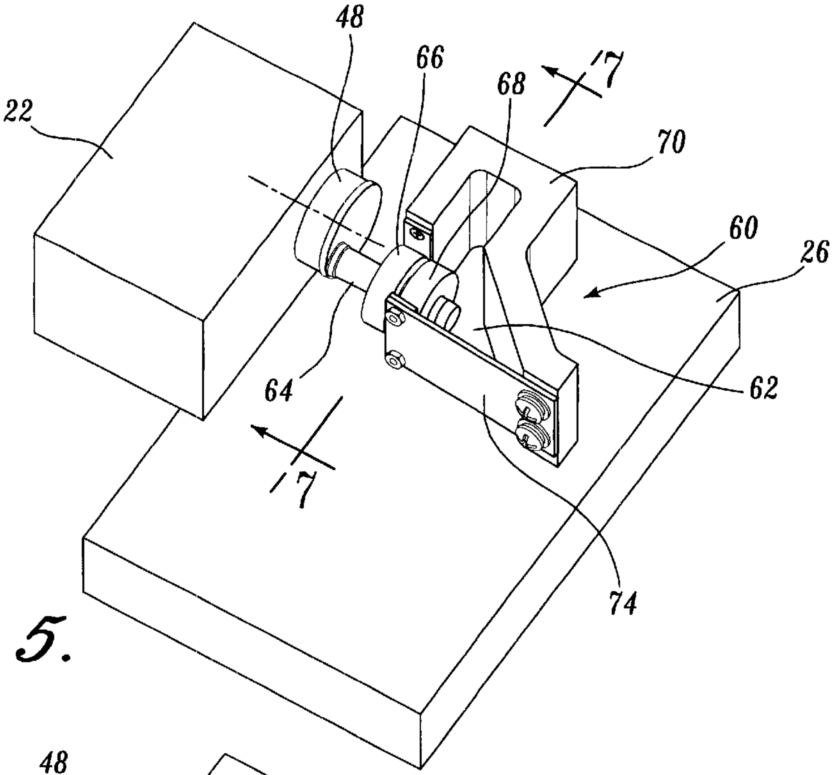
FIG. 5 is a perspective view of the preloaded stabilizer mechanism shown in FIG. 4 mounted to the support frame of the printer shown in FIG. 1 prior to translation of the carriage.
Figure 6:
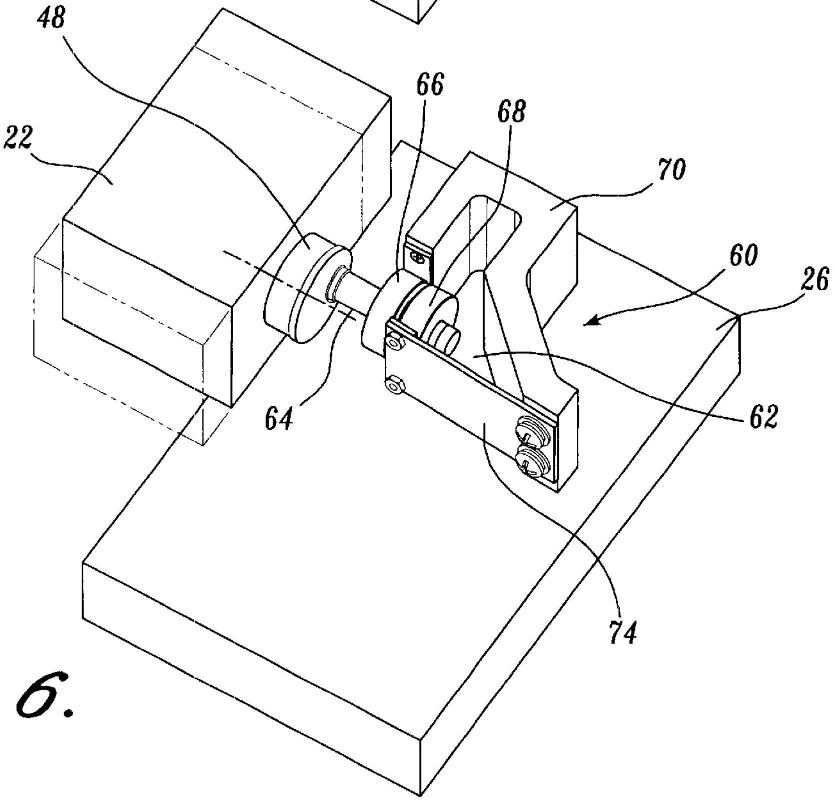
FIG. 6 is a perspective view of the preloaded stabilizer mechanism shown in FIG. 4 mounted to the support frame of the printer shown in FIG. 1 after translation of the carriage.
Figure 7:
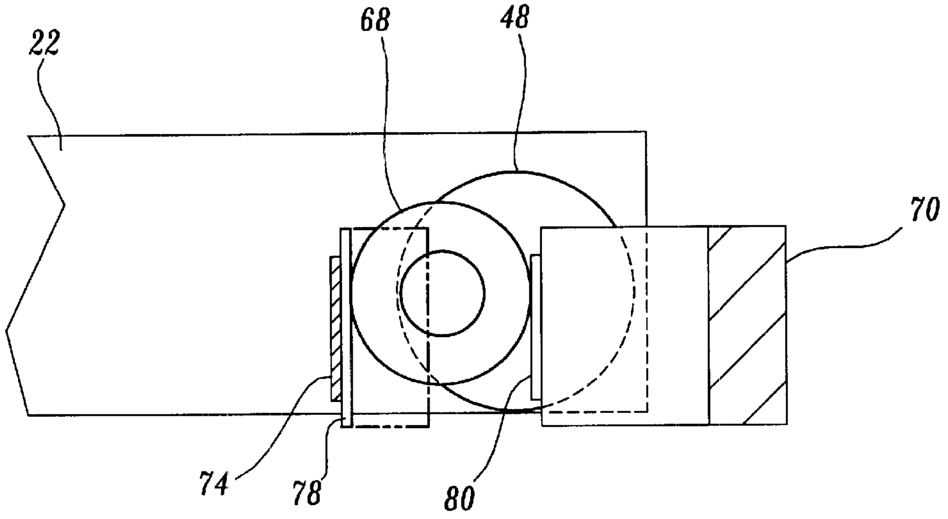
FIG. 7 is a cross-sectional view of the preloaded stabilizer mechanism shown in FIG. 5 taken along line 7—7.

As best shown in FIGS. 4–6, the spring plate 74 extends parallel to the offset shaft 64 and engages the bearing 68 at its free end 76. The spring plate 74 acts as a cantilevered member when loaded to impose pressure or force against the bearing 68. The free end 76 of the spring plate 74 includes a wear plate 78 which provides an engageable contact surface for bearing 68. A second wear plate 80 is attached to the other end of the open-ended bracket 70 to provide an engageable contact surface for bearing 66. The wear plates 78, 80 are horizontally spaced apart by a distance slightly less than the diameter of the bearings 66, 68 so that when the bearings are positioned within the triangular aperture 62, the wear plates 78, 80 impinge a force on the bearings due to the deflection of the spring plate 74.

The exemplary embodiment of the preloaded stabilizer mechanism: (1) establishes a rigid reference point that prevents the print line of the dot matrix line printer from drifting; (2) eliminates backlash; and, (3) creates a carriage resonance frequency that is greater than the carriage operating frequency. Thus, the preloaded stabilizer mechanism enhances printer system stability and reduces printer system vibration. The preloaded stabilizer mechanism 60 is located at a position on the support frame 26 to provide a rigid reference between the moving carriage 22 and the stationary support frame 26 so that the print line is not permitted to drift. The preloaded stabilizer mechanism 60 is positioned such that the offset shaft 64 is free to rotate in a plane that lies parallel to the carriage movement path as the carriage 22 moves in a reciprocating manner. A distance for shuttle travel is calculated to maximize printing speed. This distance is use dot size the counter-rotating weights and the amount of offset between the offset shaft 64 and the center of rotation of shaft 48. In a correctly designed and balanced mechanism, during translation of the carriage 22, the offset shaft 64 does not impose any translating force against the stabilizer mechanism 60, and the forces that oscillate the carriage come solely from the counter-rotating weights.

The exemplary embodiment of the improved stabilizer mechanism further eliminates backlash between the moving carriage and the support frame, and reduces vibration in the printer system. Prior art stabilizers, shown schematically in FIG. 8, addressed the unwanted vibration and backlash by preloading the sides of the slot at the bearing contact surface with biasing mechanisms, such as rubber springs. Although the preloaded double bearing functions well to inhibit backlash, there are deficiencies in this configuration. One important design consideration in moving carriage dot matrix printers is that the resonance frequency ($F_R$) of the moving carriage mechanism on its support structure must be greater than the operating shuttle frequency ($F_O$) of the moving carriage mechanism on its support structure to provide stability and inhibit vibration in the printer system.

Figure 8:
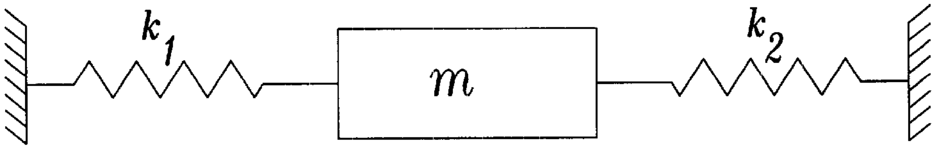
Fig. 8. ( PRIOR ART )
FIG. 8 is a schematic view of a moving mass system representative of the moving carriage of prior dot matrix line printers.

Referring to FIG. 8, the resonance frequency ($F_R$) of the moving carriage on its support structure is computed by the following equation:

$$F_R=(1/2\pi)\sqrt{(K_1+K_2)/m} \quad (1)$$

where:

$F_R$=resonance frequency;

$K_1$=spring rate of the first spring;

$K_2$=spring rate of the second spring;

m=mass of the carriage;

To provide a resonance frequency ($F_R$) that meets this requirement, the spring rate of each of the rubber springs ($K_1$, $K_2$) must be significantly large. If the spring factors of each of the rubber springs ($K_1$, $K_2$) are large enough to satisfy the resonance frequency ($F_R$) requirement, the preload from the springs overload the bearings, resulting in unnecessary mechanical wear, or even worse, mechanical failure. Using bearings that are capable of handling the amount of preload required to provide a resonance frequency ($F_R$) greater than the operating shuttle frequency ($F_O$) would be cost-prohibitive in typical dot matrix line printers.

The preloaded stabilizer mechanism of the present invention solves the foregoing problem by constraining the offset shaft between a soft spring, i.e. the spring plate, and a rigid mount, i.e. the side of the open bracket. Since the spring rate for the rigid mount is much greater than the spring rate of the soft spring ($K_2 >> K_1$), equation (1) above reduces to:

$$F_R \approx (1/2\pi)\sqrt{K_2/m} \quad (2)$$

Thus, by having a large spring rate for the rigid mount, the resonance frequency ($F_R$) of the moving carriage mechanism on its support structure is greater than the operating shuttle frequency ($F_O$) of the moving carriage mechanism on its support structure. The use of a soft spring also allows a relatively constant preload force over the range of expected spacings between the spring plate and the rigid surface.

Referring back to FIGS. 5–7, reciprocation of the carriage and the effects of the preload stabilizer mechanism will be described in detail. When power is supplied to the electric motor 56, the electric motor 56 provides torque to the twin counter-rotating spur gears 42, 44 via the driving belt 54. As the unbalanced weights 82, 84 of the spur gears 42, 44 rotate in opposite directions, a net horizontal force is produced that causes the carriage 22 to reciprocate in a direction parallel to the elongate side of the support frame 26 of the dot matrix line printer 20. Likewise, as the spur gears 42, 44 rotate, the lower shaft 48 rotates the offset shaft 64 within the triangular aperture of slot 62 formed by the preloaded stabilizer mechanism 60. During printer operation, when pure sinusoidal motion results from the counter rotating shuttle mechanism 24, the bearings 66, 68 impose an equal force against either side of the triangular slot 62. Pure sinusoidal motion only occurs when the shuttle mechanism 24 is in perfect dynamic balance with the moving carriage 22. A distance for shuttle travel is calculated to maximize printing speed. This distance is use dot size the counter-rotating weights and the amount of offset between the offset shaft and the center of rotation of shaft 48. In a correctly designed and balanced mechanism, during translation of the carriage, the offset shaft does not impose any translating force against the stabilizer mechanism, and the forces that oscillate the carriage come solely from the counter-rotating weights.

In an operational state when the shuttle mechanism 24 is not in perfect dynamic balance with the moving carriage 22, the offset shaft 64 imposes a force, corresponding to the amount of imbalance, against the preloaded spring plate 74 and bracket member 70 because the imbalance attempts to cause the travel distance of the carriage 22 to deviate from the predetermined travel distance. In this state, the stabilizer mechanism 60, due to the offset shaft/triangle slot arrangement, works in conjunction with the shuttle mechanism 24 to translate the carriage 22 while limiting the distance the carriage may travel. Thus, the stabilizer mechanism 60 inhibits the movement of the offset shaft 64 with respect to the support frame 26 when the force created by the unbalance is equal to or less than the force of the preload. Therefore, the stabilizer mechanism 60 prevents resonance (vibration) as long as the vibratory force is less than the amount of preload. For example, the spring plate 74 may be deflected a distance that develops 25 lbs. of force against the offset shaft. The spring plate 74 can inhibit movement, and thus vibration, of the offset shaft 64 until the imbalanced force of the carriage/shuttle mechanism reaches a force of 25 lbs.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a dot matrix printer having a support frame, a carriage reciprocally mounted on the support frame, the carriage having multiple print elements thereon, and a shuttle mechanism coupled to the carriage, the shuttle mechanism causing the carriage to reciprocate on the support frame, the improvement comprising: a stabilizer mechanism mounted on the support frame, the stabilizer mechanism including a bracket member and a spring plate, the spring plate attached to the bracket member at one end to form a slot; the stabilizer mechanism receiving an offset shaft coupled to the shuttle mechanism within the slot, the spring plate imposing a force against the offset shaft.

2. The improvement of claim 1, wherein the spring plate includes a wear plate mounted thereon.

3. The improvement of claim 2, wherein the wear plate is mounted at a free end of the spring plate.

4. The improvement of claim 1, wherein the stabilizer mechanism provides a reciprocating motion to the carriage when the shuttle mechanism is unbalanced.

5. The improvement of claim 4, wherein the stabilizer mechanism prohibits vibration in the carriage when the force generated by the unbalance is less than the force imposed by the spring plate against the offset shaft.

6. The improvement of claim 1, wherein the offset shaft includes a bearing mounted thereon, the spring plate imposing a force against the bearing.

7. The improvement of claim 1, wherein the stabilizer mechanism provides the printer with a resonance frequency greater than the operational frequency.

8. A stabilizer mechanism for a reciprocating carriage reciprocated by a drive mechanism, the stabilizer mechanism comprising:

a bracket member connectable to a support frame, the bracket member having two ends; and a biasing member having a coupled end and a free end, the coupled end of the biasing member attached to one end of the bracket member to form a slot;

wherein the stabilizer mechanism is adapted to receive an offset shaft of the drive mechanism within the slot, the biasing member capable of imposing a preload force against the offset shaft in the direction of carriage motion when the offset shaft is within the slot.

9. The stabilizer mechanism of claim 8, wherein the biasing member is a spring plate, the spring plate including a wear plate mounted thereon.

10. The stabilizer mechanism of claim 9, wherein the wear plate is mounted at the free end of the spring plate.

11. The stabilizer mechanism of claim 8, wherein the stabilizer mechanism provides a reciprocating motion to the carriage when the shuttle mechanism is unbalanced.

12. The stabilizer mechanism of claim 11, wherein the stabilizer mechanism prohibits vibration in the carriage when the force generated by the unbalance is less than the force imposed by the spring plate against the offset shaft.

13. The stabilizer mechanism of claim 11, wherein the stabilizer mechanism provides the shuttle with a resonance frequency greater than the operational frequency.

14. The stabilizer mechanism of claim 8, wherein the biasing member constantly engages the offset shaft during carriage motion.

15. A dot matrix line printer comprising:

a support frame;

a carriage reciprocally mounted on the support frame, the carriage having multiple print elements thereon;

a shuttle mechanism coupled to the carriage, the shuttle mechanism causing the carriage to reciprocate on the support frame; and a stabilizer mechanism mounted on the support frame, the stabilizer mechanism including a bracket member and a spring plate, the spring plate attached to the bracket member at one end to form a slot;

wherein the stabilizer mechanism receives an offset shaft coupled to the shuttle mechanism within the slot, the spring plate imposing a preload force against the offset shaft.

16. The printer of claim 15, wherein the spring plate includes a wear plate mounted thereon.

17. The printer of claim 16, wherein the wear plate is mounted at the free end of the spring plate.

18. The printer of claim 15, wherein the stabilizer mechanism provides a reciprocating motion to the carriage when the shuttle mechanism is unbalanced.

19. The printer of claim 18, wherein the stabilizer mechanism prohibits vibration in the carriage when the force generated by the unbalance is less than the force imposed by the spring plate against the offset shaft.

20. The printer of claim 15, wherein the offset shaft includes a bearing mounted thereon, the spring plate imposing a force against the bearing.

21. The printer of claim 15, wherein the stabilizer mechanism provides the printer with a resonance frequency greater than the operational frequency.

22. A dot matrix line printer comprising:

a support frame;

a carriage reciprocally mounted on the support frame, the carriage having multiple print elements thereon;

a drive mechanism having an offset shaft, the drive mechanism causing the carriage to reciprocate on the support frame; and a stabilizer mechanism including a bracket member coupled to a biasing member, thereby forming a slot;

wherein the stabilizer mechanism receives the offset shaft of the drive mechanism within the slot, the biasing member imposing a preload force against the offset shaft.

23. The printer of claim 22, wherein the stabilizer mechanism is mounted on the support frame.

* * * * *